United States Patent
Ramamurthy et al.

(10) Patent No.: US 10,871,814 B1
(45) Date of Patent: *Dec. 22, 2020

(54) REDUCING TRANSITIONS BETWEEN IDLE AND ACTIVE STATES

(71) Applicant: Sprint Communications Company L.P., Overland Park, KS (US)

(72) Inventors: Suryanarayanan Ramamurthy, Olathe, KS (US); Deveshkumar N. Rai, Overland Park, KS (US); Saravana Kumar Velusamy, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 395 days.

This patent is subject to a terminal disclaimer.

(21) Appl. No.: 15/831,504

(22) Filed: Dec. 5, 2017

Related U.S. Application Data (63) Continuation of application No. 14/085,362, filed on Nov. 20, 2013, now Pat. No. 9,864,422.

(51) Int. Cl.
    G06F 1/00     (2006.01)
    G06F 1/32     (2019.01)
    G06F 1/3215   (2019.01)

(52) U.S. Cl.
    CPC .............. *G06F 1/32* (2013.01); *G06F 1/3215* (2013.01)

(58) Field of Classification Search
    CPC ........................................................ G06F 1/32
    USPC ........................................................ 713/323
    See application file for complete search history.

(56) References Cited

U.S. PATENT DOCUMENTS

| | | | |
|---|---|---|---|
| 8,655,307 B1* | 2/2014 | Walker | H04W 72/0493 455/405 |
| 2002/0172178 A1* | 11/2002 | Suzuki | H04W 76/38 370/338 |
| 2004/0214616 A1* | 10/2004 | Malcolm | H04W 52/0241 455/574 |
| 2005/0287949 A1 | 12/2005 | Harris et al. | |
| 2006/0193332 A1 | 8/2006 | Qian et al. | |
| 2010/0248643 A1 | 9/2010 | Aaron et al. | |
| 2011/0269463 A1* | 11/2011 | Wang | H04W 52/0232 455/436 |
| 2012/0120843 A1* | 5/2012 | Anderson | H04W 52/0232 370/253 |
| 2015/0017970 A1 | 1/2015 | Takiguchi et al. | |
| 2015/0055565 A1* | 2/2015 | Kotecha | H04W 76/38 370/329 |
| 2015/0236985 A1* | 8/2015 | Chandramouli | H04L 47/2475 370/328 |

* cited by examiner

Primary Examiner — Volvick Derose (57) ABSTRACT

Systems, methods, and computer-readable media, for reducing transitions between active and idle states are provided. In some embodiments, transition data indicating transitions between an active state and an idle state associated with a mobile device is received. Thereafter, an idle state pattern that indicates a pattern of an idle state associated with the mobile device is identified. Based on the idle state pattern, an inactivity timer update corresponding with the idle state pattern is provided to at least one communication tower. The inactivity timer update provides a time duration or time duration adjustment to be applied by the at least one communication tower for use in detecting a transition from an active state to an idle state.

20 Claims, 5 Drawing Sheets

REDUCING TRANSITIONS BETWEEN IDLE AND ACTIVE STATES

CROSS REFERENCE TO RELATED APPLICATIONS

This application is a continuation of U.S. patent application Ser. No. 14/085,362, filed on 20 Nov. 2013 and titled "Reducing Transitions Between Idle and Active States," the disclosure of which is incorporated in its entirety by reference herein.

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, reducing transitions between idle and active states associated with a user device. Utilizing embodiments hereof, idle state pattern(s) for a user device can be identified. Based on the pattern(s) exhibited by the user device, an inactivity time duration used by a communication tower can be established for the specific user device to avoid unnecessary transitions between active and idle states. In other embodiments hereof, deep packet inspection can be triggered for a specific device(s) to capture or collect transition data associated with the device. Such transition data can then be used to identify applications, devices, and/or device types that appear to be causing superfluous transitions between active and idle states.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| CD-ROM | Compact Disk Read Only Memory |
| CDMA | Code Division Multiple Access |
| ECM | EPS Connection Management |
| GIS | Geographic/Geographical/Geospatial Information System |
| GPRS | General Packet Radio Service |
| GSM | Global System for Mobile communications: originally from Groupe Special Mobile |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| PC | Personal Computer |
| PCS | Personal Communications Service |
| PDA | Personal Digital Assistant |
| RAM | Random Access Memory |
| ROM | Read Only Memory |
| TDMA | Time Division Multiple Access |
| UMTS | Universal Mobile Telecommunications Systems |

Further, various technical terms are used throughout this description. An illustrative resource that fleshes out various aspects of these terms can be found in Newton's Telecom Dictionary, 26th Edition (2011).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
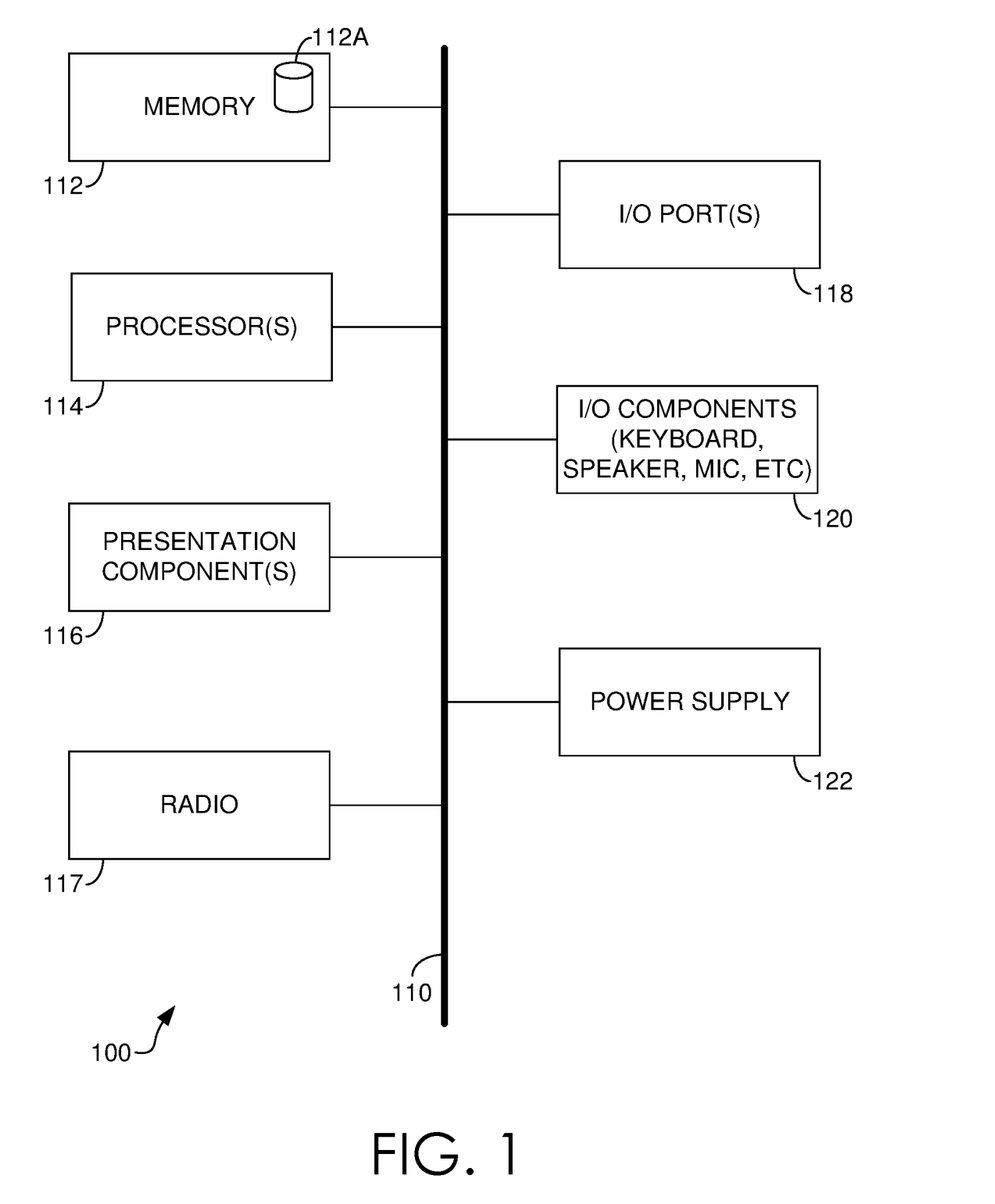
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

Embodiments of the present invention facilitate reducing transitions between idle and active states associated with a user device. Utilizing embodiments hereof, idle state pattern(s) for a user device can be identified. Based on the pattern(s) exhibited by the user device, an inactivity time duration used by a communication tower can be established for the specific user device to avoid unnecessary transitions between active and idle states. In other embodiments herein, deep packet inspection can be triggered for a specific device(s) to capture or collect transition data associated with the device. Such transition data can then be used to identify applications, devices, and/or device types that appear to be causing superfluous transitions between active and idle states.

User devices commonly transition between idle states and active states. In this regard, a user device may be in an idle state when no activity is performed at the user device and transition to an active state when activity is performed at the user device, and vice versa. Performance of an activity at the user device is generally due to applications that perform some type of functionality. Such activity being performed at the device resulting in an active state may be any transmitting or receiving data including heartbeats intended to wake up the device from an idle state. Generally, in an active state, an application operates in temporary memory of the user device.

Even when an application is not being actively utilized by a user of a user device, the user device may transition from an idle state to an active state with minimal data transmissions. For instance, a user device application may cause the user device to enter an active state to download any recent updates, to receive or provide data, to provide or display a status, to provide a heartbeat intended to wake up the device from an idle state, or the like. As a specific example, a user device application might be associated with an algorithm that wakes up after a predetermined time duration (e.g., 2 seconds), communicates a status, and then returns to a dormant state. As a result, an active state might be transitioned to from an idle state even though the user is not actively utilizing any applications.

With the increasing utilization of applications on user devices, the quantity of transitions between an idle state and active state also increases due to various applications independently causing or initiating transitions between states. As the transitions between idle and active states caused by the applications are not synchronized with one another, the frequent transitions can be unduly burdensome on the user device and reduce the battery life of the user device.

Further, such frequent transitions also impact network components, such as communication towers. In transitioning from an idle state to an active state, a user device requests resources to enable data communication. In this way, the user device requests assignment of dedicated resources such that the device can perform some functionality such as sending and/or receiving an acknowledgement message, etc. Each time the user device transitions from an idle state (e.g., ECM idle state) to an active state (ECM active state or ECM connected state), the mobile device communicates with a communication tower to obtain a traffic path for communicating. As such, the communication tower can build, setup, or establish a traffic path for the user device so that the user device can use the traffic path to communicate.

When a communication tower recognizes that the user device is idle (e.g., the device has not transmitted and/or received a communication with a specified time period), the traffic path is torn down since it is not currently needed for that user device. Accordingly, a traffic path can be allocated to another user device. In addition to the burden of setting up and tearing down traffic paths corresponding with transitions between an idle state and an active state, utilization of traffic paths to simply communicate a status update or heartbeat indicator may unnecessarily restrict or limit other user devices from use of such traffic paths.

As a result of excessive signaling and unnecessary allocation and de-allocation of the air interface between user devices and communication towers, embodiments of the present invention are directed to facilitating minimization of unnecessary use (e.g., building up and tearing down) of traffic paths between communication towers and user devices. In this regard, one aspect of the present invention modifies the period of time for detecting transitions of a user device based on data patterns of the user device to reduce the amount of signaling and frequency of transitions. In another aspect of the present invention, data patterns of a user device(s) are monitored to identify, for example, an application(s) and/or device type(s) causing an impactful behavior, such as excessive signaling and an unnecessary allocation/de-allocation process.

Accordingly, in one aspect, the present invention is directed to one or more computer-readable media having computer-executable instructions embodied thereon that, when executed, perform a method for facilitating reduction of transitions between active and idle states. The method includes receiving transition data indicating transitions between an active state and an idle state associated with a mobile device. An idle state pattern that indicates a pattern of an idle state associated with the mobile device is identified. Thereafter, an inactivity timer update corresponding with the idle state pattern to at least one communication tower is provided. The inactivity timer update provides a time duration or time duration adjustment to be applied by the at least one communication tower for detecting a transition from an active state to an idle state.

In another aspect, embodiments of the present invention are directed to method for facilitating reduction of transitions between active and idle states. The method includes designating an inactivity time duration for a specific user device in accordance with a pattern of idle state durations exhibited by the user device. Thereafter, the designated inactivity time duration is used to determine a transition between an active state and an idle state associated with the user device.

In yet another aspect, a system for facilitating reduction of transitions between active and idle states is provided. The system includes a management entity configured to trigger deep packet inspection for data packets associated with a specific user device by communicating a deep packet inspection request in association with the user device. The system also includes a connectivity gateway configured to receive the deep packet inspection request, identify at least one data packet associated with the user device, and initiate a deep packet inspection of the at least one data packet. The system further includes a deep packet inspector configured to perform a deep packet inspection of the at least one data packet and obtain data related to transitions of the user device between active states and idle states.

Figure 2:
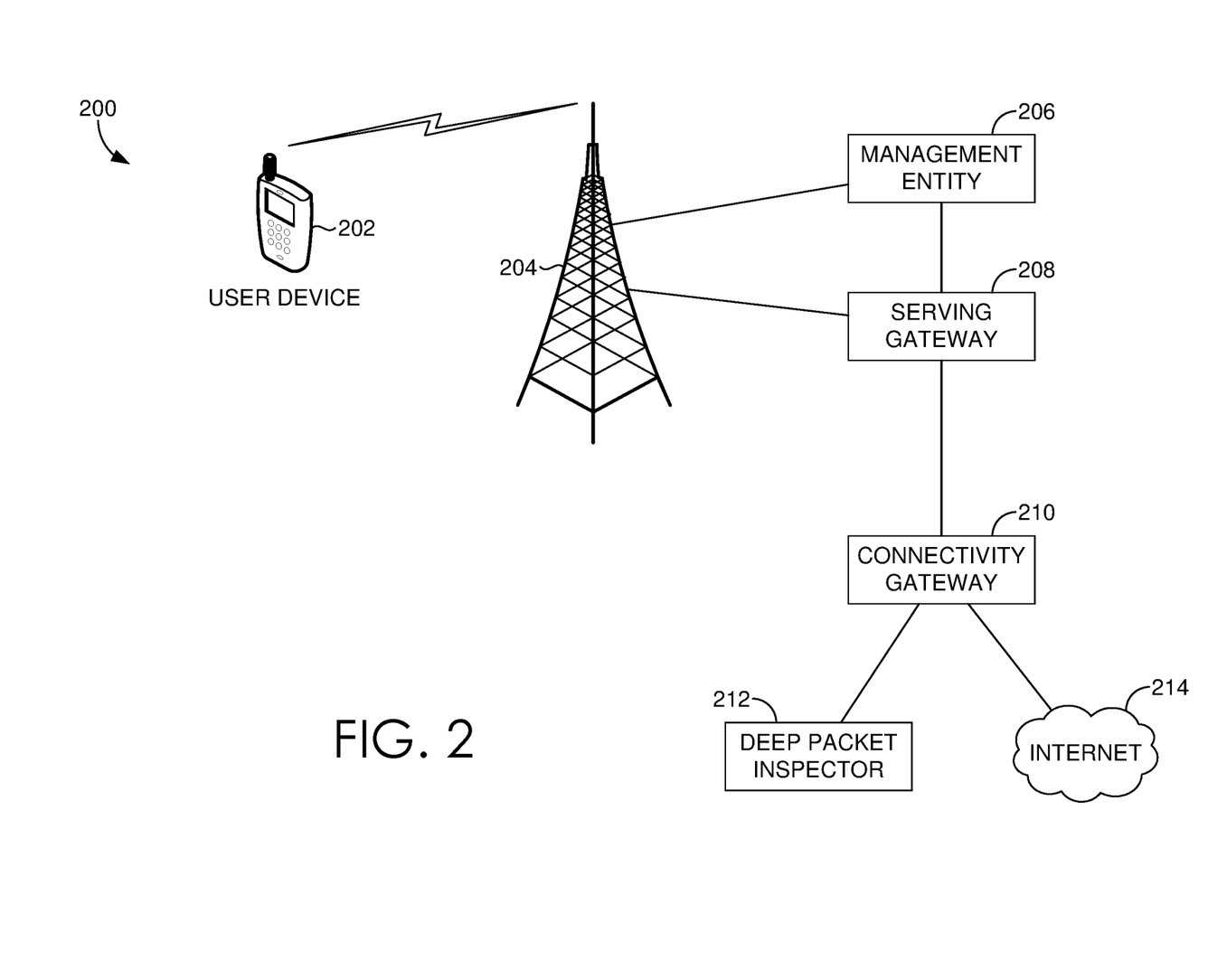
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a communication tower 204 may communicate with a user device 202 via a network(s). A network might be a single network or multiple networks, as well as being a network of networks. In embodiments, network is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Long Term Evolution (LTE), Universal Mobile Telecommunications Systems (UMTS), Integrated Digital Enhanced Network (iDEN), WiMAX, 3G, 4G, and Personal Communications Service (PCS). In one embodiment, the network is or includes a LTE network. A wireless telecommunications network might include an array of devices.

In the network environment 200, the user device 202 may communicate, for example, with another mobile device, a server, or the like. The user device 202 may take on a variety of forms, such as a personal computer (PC), a laptop computer, a tablet, a mobile phone, a personal digital assistant (PDA), or any other user device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunications network is utilized for communication (e.g., voice and/or data communication). In this regard, the user device communicates with other devices using a wireless telecommunications network(s).

The communication tower 204 refers to a tower that facilitates wireless communication between user devices. Depending on the wireless communication technologies employed by the network, a communication tower might be referred to as or include a base transceiver station (BTS), a radio base station (RBS), a base station (BS), a node B (in 3G networks), or an eNodeB (in LTE network).

The management entity 206 communicates with the communication tower 204. The management entity 206 refers to a control or control node for the network (access network, such as LTE). In a LTE access-network, the management entity 206 might be referred to as a mobile management entity (MME). The management entity 206 might have various responsibilities. For example, the management entity 206 may be responsible for idle state and/or active state tracking for mobile devices. Further, the management entity 206 can be involved with the bearer activation/deactivation process. The management entity 206 can also be responsible for choosing a service gateway for a user device, for example, at the time of the initial attachment. Using a home subscriber server (HSS), the management entity 206 can also facilitate user authentication.

The serving gateway 208 routes and forwards user data packets. The serving gateway 208 can have a variety of responsibilities including, for example, acting as the mobility anchor. Further, for idle state user devices, the serving gateway 208 may terminate downlink data paths and trigger paging when downlink data arrives for the user device. The serving gateway 208 may also manage and store attributes associated with the user device, such as, for example, parameters of the IP bearer service and network internal routing information.

The connectivity gateway 210 provides connectivity from the user device to external packet data networks, such as the Internet 214. In this regard, the connectivity gateway 210 is the point of exit and entry of traffic for the user device 202. The connectivity gateway 210 may perform, for instance, packet filtering, charging support, packet screening, and policy enforcement.

The deep packet inspector 212 is configured to perform deep packet inspection, complete packet inspection, or traffic detection function. The deep packet inspector 212 performs network packet filtering by examining at least the data portion of packets. The deep packet inspector 212 can search for various attributes, such as protocol non-compliance, viruses, spam, intrusions, transition data (as described more fully below), or other defined criteria.

Although network environment 200 is illustrated with single components, as can be appreciated, the components are scalable and any number of each of the components may exist in the network environment. Further, although not illustrated herein, additional components or combination of components may exist within the network environment 200.

With continued reference to FIG. 2, components of network environment 200 are now described with regard to one aspect of the present invention directed to modifying the period of time used for detecting transitions of a user device. Modifying the period of time used for detecting user device transitions to align or correspond with transition patterns of the user device can reduce efforts and resources used to establish and tear down traffic paths for the user device. By way of example only, assume that a communication tower has an inactivity time duration that is globally set to three seconds. When the communication tower recognizes data/traffic from a user device, the timer begins. If the inactivity time duration of three seconds expires without recognizing any further data communication (e.g., to and/or from the device), the communication tower assumes the user device is idle. Further assume that the user device generally has a pattern of a four second idle state duration. That is, the user device generally remains idle for four seconds before activating, for example, to push information for an application or check email. Because the communication tower waits only three seconds before designating the user device as being in an idle state, the communication tower tears down the traffic path after three seconds. One second later (i.e., four seconds after last data transmission), the communication tower then has to reestablish a communication path for the user device, for example, based on a request to push information or check email. Adjusting the inactivity time duration at the communication tower to four seconds (or more) for the particular user device, however, would eliminate the detection of a transition from active to idle thereby avoiding the superfluous tear down and setup.

In operation, when the user device 202 transitions from an idle state to an active state or from an active state to an idle state, the communication tower 204 is configured to recognize such transitions. Such recognition of transitions can occur in any manner. By way of example, when the user device 202 transitions from an idle state to an active state, the communication tower 204 recognizes a request for resources to enable communication. Upon recognizing such a request for resources and thereby a transition from an idle state to an active state, a traffic path is setup for the user device 202. When the user device 202 transitions from an active state to an idle state, the communication tower recognizes or detects such a transition based on a lack of reception of any data transmissions or communications to and/or from the user device to the communication tower 204. For example, if a timer indicates inactivity for a duration exceeding a predetermined threshold value (e.g., established for the user device), a transition from an active state to an idle state is recognized. Upon recognizing a transition from an active state to an idle state, the communication tower initiates tear down of a communication path existing for the user device. In this way, when inactivity associated with the user device persists beyond an inactivity threshold duration, the communication tower initiates a tear down of the communication path of the user device.

The communication tower 204 communicates with the management entity 206 (e.g., using a controlling interface) to provide transition indicators to the management entity 206. In this regard, the communication tower 204 might automatically provide transition indicators to the management entity 206 and/or the management entity 206 might retrieve transition indicators from the communication tower 204. A transition indicator refers to an indication of a transition from an idle state to an active state (i.e., idle-to-active indicator) or an indication of a transition from an active state to an idle state (i.e., active-to-idle indicator). By way of example only, communication of a context release request from the communication tower 204 to the mobile manager 206 can be a transition indicator as it represents inactivity at the user device for a particular amount of time.

Alternatively or additionally to the management entity 206 obtaining transition indicators from the communication tower 204, the management entity 206 might be configured to obtain transition indicators from the user device 202. In this regard, the management entity 206 might manage the communication tower and/or user devices to various extents, for example, depending on the type of access network (e.g., LTE, EVDO, etc.) thereby enabling the management entity 206 to obtain transition indicators from communication towers and/or user devices. A transition indicator may include or be transmitted in association with additional information, such as a type of transition (e.g., active-to-idle or idle-to-active), a time of transition, a time duration of having a particular state, a user device identifier associated with the user device making the transition, etc.

The management entity 206 obtains transition indicators associated with the user device 202, among other user devices. The management entity 206 can collect transition indicators, such as active-idle indicators and/or idle-active indicators, and/or analyze transition indicators for any period of time. In some embodiments, a predetermined period of time is used to collect and/or analyze transitions for a user device. In other embodiments, a collection and/or analysis time period is dynamically determined.

In analyzing the obtained transition indicators, the management entity 206 identifies patterns of transitions between idle and active states of the user device 202. In this regard, the management entity 206 might identify an idle pattern that is a pattern of idle periods of time for which the user device 202 is idle before transitioning to an active state. For example, the management entity 206 might recognize that the user device is consistently in an idle state for 4.2 seconds before returning to an active state. As another example, the management entity 206 might identify an active pattern that is a pattern of active periods of time for which the user device 202 is active before transitioning to an idle state. Active and/or idle time periods might be determined at the management entity 206 based on received data (e.g., a time duration associated with a particular state) or in accordance with a timer that computes elapsed time between occurrences of activity or transitions as detected by the communication tower or user device. As the management entity 206 can be associated with multiple communication towers, the management entity 206 can analyze transition patterns for a device using multiple communication towers (e.g., as the mobile device moves locations).

Upon identifying, detecting, or determining a transition pattern, such as an idle pattern (e.g., maintains an idle state for 4.2 seconds) and/or an active pattern, the management entity 206 sends an inactivity timer update for the user device 202 to the communication tower 204 in accordance with the identified transition pattern for the user device 202. An inactivity timer update refers to a modification or new inactivity timer value for use by the communication tower 204. As can be appreciated, in some embodiments, the management entity 206 may operate based on criteria as to when to identify a pattern and/or send an inactivity timer update to the communication tower 204. For example, an effort to detect a transition pattern might be made periodically or might be made only upon detecting a particular frequency of transitions of a user device. As another example, upon detecting a transition pattern based on an occurrence of a particular number of transitions, the inactivity timer update might be identified and/or transmitted to the communication tower.

As can be appreciated, in some cases, the management entity 206 might be configured to transmit the inactivity timer update (e.g., equal to the idle pattern or including an adjustment to the pattern) such that the communication tower implements or determines whether to implement. In other cases, the management entity 206 might compare the inactivity time duration currently used by the communication tower with the idle pattern to determine an increase or decrease to apply to the currently used inactivity time duration. In such a case, the management entity 206 can provide the inactivity timer update as an adjustment for the communication tower to apply to the currently used inactivity time duration.

Upon the communication tower 204 obtaining the inactivity timer update, any appropriate modifications to the inactivity time duration or inactivity time threshold can be implemented for the appropriate device at the communication tower 204. As such, an inactivity time duration or inactivity time threshold can be increased or decreased in accordance with an idle transition pattern detected for the user device. In this way, implementing an inactivity time duration that exceeds a general idle transition pattern of the user device can minimize the number of transitions between the active and idle state from the communication towers perspective, which can prevent frequent or unnecessary tear down and set up of traffic paths. As a result, communication tower processing and user device battery performance can be improved. In accordance with the implemented inactivity time duration for the user device 202, the communication tower 204 waits the allotted inactivity time duration before identifying the user device 202 as having entered an idle state. That is, upon the lapse of the inactivity time for a particular user device, if no activity, such as data communications, has been performed by the user device, the communication tower 204 identifies the user device as having entered the idle state and, as such, begins tearing down the traffic path for the user device.

By way of example only, assume that the management entity 206 observes a pattern that the user device 202 remains in an idle state for three seconds before it enters an active state. In accordance with the user device remaining in the idle state for three seconds before transitioning to an active state, the management entity 206 can provide an inactivity timer update of 3.2 seconds to the communication tower 204. Alternatively, the management entity 206 could provide an inactivity timer update of 3 seconds (equal to the length of the idle state) providing an indication to the communication tower of the three second pattern and thereby allowing the communication tower 204 to modify the inactivity timer associated with the user device 202. For instance, the communication tower 204 might increase any received inactivity timer update by 0.2 seconds to allow for deviations to the detected three second pattern. The communication tower 204 will now wait an inactivity time period of 3.2 seconds before making a determination of whether the user device 202 is in an idle state. As a result, when the user device returns to an active state after being idle for 3 seconds, an idle state has not yet been declared by the communication tower 204 and, as such, the communication tower 204 avoids performing a tear down of a traffic path and rebuilding a traffic path at three seconds when the user device 202 returns to the active state.

As can be appreciated, rather than the communication tower 204 utilizing a global inactivity time duration, such as two seconds, for each user device utilizing a particular communication tower, inactivity times or time durations can be device-specific so as to avoid unnecessary tear down and set up of traffic paths. In this way, each user device can have a specific inactivity time for determining existence of transitions, such as idle-to-active transitions. For example, assume an inactivity time for a mobile device is set for 4.2 seconds. If traffic is not detected upon the lapse of 4.2 seconds since the last communication associated with the device (e.g., no packets sent and/or received within the 4.2 seconds), the communication tower 204 recognizes the user device as having entered an idle state and, as such, the communication tower 204 tears down the traffic path between the user device 202 and the communication tower 204. Although described herein as modifying the inactivity time duration within a communication tower, it can be appreciated that in other embodiments, the management entity 206 and/or the communication tower 204 might communicate with the user device 202 to request that the user device 202 avoid transitioning to an idle state until a particular lapse of time.

Although the management entity is described herein as detecting transition patterns, as can be appreciated, other network components could be configured to perform such functionality. For example, such functionality could be performed by the communication tower 204 or other device. Further, in some embodiments, transition pattern detection is also contemplated to be performed by the user device 202.

Figure 3:
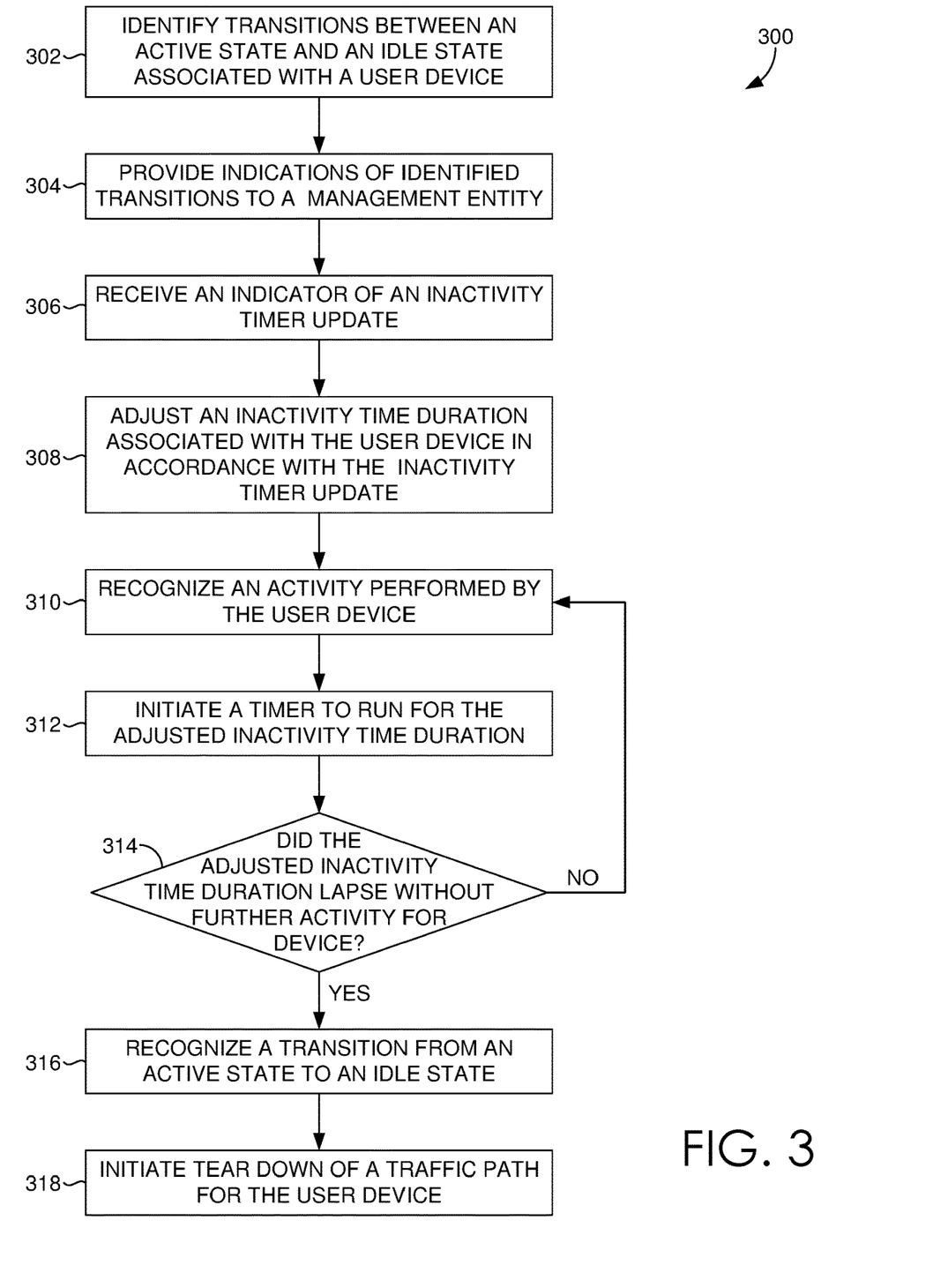
FIG. 3 provides an exemplary first method for facilitating establishment of an inactivity time duration specific to a user device, in accordance with embodiments of the present invention.
Figure 4:
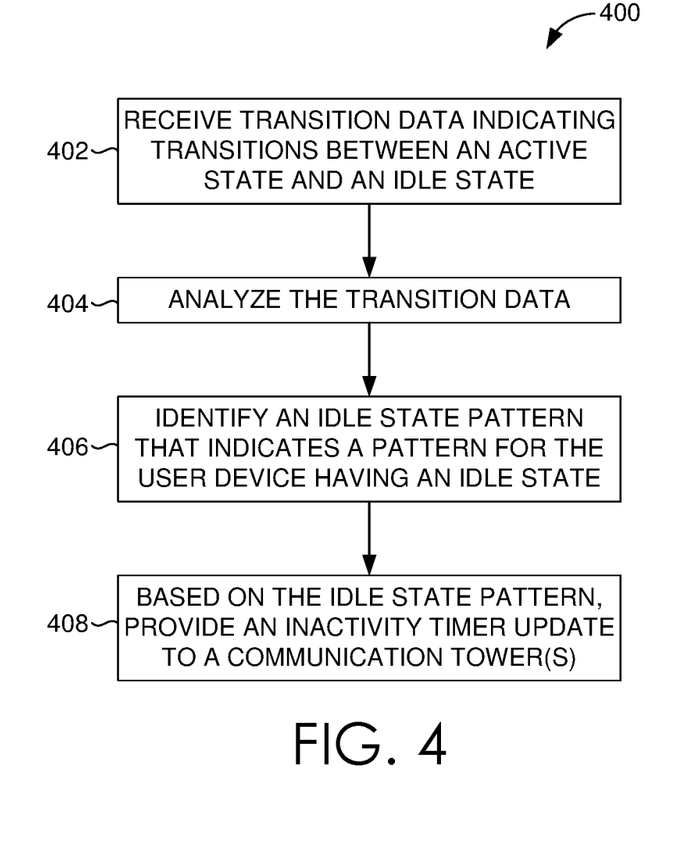
FIG. 4 provides an exemplary second method for facilitating establishment of an inactivity time duration specific to a user device, in accordance with embodiments of the present invention.

Turning now to FIGS. 3 and 4, methods for reducing transitions between idle and active states in association with a device are provided. In particular, FIGS. 3 and 4 show a flow diagram illustrating a method to facilitate establishing an inactivity time duration specific to a user device that corresponds with the transition patterns of the user device, in accordance with embodiments of the present invention. It will be understood by those of ordinary skill in the art that the order of steps shown in the method 300 of FIG. 3 and method 400 of FIG. 4 are not meant to limit the scope of the present invention in any way and, in fact, the steps may occur in a variety of different sequences within embodiments hereof. Any and all such variations, and any combination thereof, are contemplated to be within the scope of embodiments of the present invention.

With initial reference to FIG. 3, in embodiments, method 300 can be performed at a communication tower, such as communication tower 204 of FIG. 2. Initially, as indicated at block 302, transitions between an active state and an idle state associated with a user device are identified. For example, an active state might be identified based on a resource request communicated from the user device. Further, an idle state might be identified upon expiration of a predetermined period of time (inactivity time duration) during which no data transmissions to and/or from the user device were detected. At block 304, indications of the identified transitions are provided to a management entity, such as management entity 206 of FIG. 2. Such transition indications may include, by way of example and not limitation, a type of transition (active-idle transition or idle-active transition), a time of transition, a user device associated with the transition, a duration of an active state or idle state prior to a transition, etc.

At block 306, an indication of an inactivity timer update is received. Subsequently, at block 308, an inactivity time duration associated with the user device is adjusted in accordance with the inactivity timer update. Depending on the previously set inactivity time duration associated with the user device, the inactivity timer update may cause the previous inactivity time duration to increase or decrease. As can be appreciated, in some cases, the previous inactivity time duration set for the user device might be a predetermined, standard, or default time duration (e.g., 2 seconds). In other cases, the previous inactivity time duration might be one that was previously adjusted based on a previously received inactivity timer update. Further, as previously described, the inactivity time duration can be set to be equal to the received inactivity timer update or adjusted from the received inactivity timer update, for example, to accommodate for potential deviations, etc.

At block 310, an activity performed by the user device is recognized. Such recognition might be based on, for instance, a data transmission. In accordance with the data transmission, a timer is initiated to run for the adjusted inactivity time duration associated with the user device, as indicated at block 312. At block 314, a determination is made as to whether the adjusted inactivity time duration lapsed without further activity detected for the user device. If it is determined that the adjusted inactivity time duration did not lapse without further activity detected for the user device, the method returns to block 310 at which activity performed by the user device is recognized. On the other hand, if it is determined that the adjusted inactivity time duration did lapse without further activity detected for the user device, at block 316, a transition from an active state to an idle state is recognized. Thereafter, at block 318, a tear down of the traffic channel for the user device is initiated.

With reference now to FIG. 4, in embodiments, method 400 can be performed at a management entity, such as management entity 206 of FIG. 2. Initially, as indicated at block 402, transition data indicating transitions between an active state and an idle state is received. Such transition data may include, by way of example and not limitation, a type of transition (active-idle transition or idle-active transition), a time of transition, a user device associated with the transition, a duration of an active state or idle state prior to a transition, etc. Thereafter, at block 404, the transition data is analyzed.

Based on the analysis of the transition data, an idle state pattern that indicates a pattern for the user device associated with an idle state is identified, as indicated at block 406. For instance, an idle state pattern might indicate that the user device has a tendency to remain in an idle state for four seconds before returning to an active state. An idle state pattern can be identified in any manner. For instance, in one embodiment, idle time durations for which the user device maintained an idle state can be aggregated and compared to one another. A general pattern can be detected therefrom, for example, based on a median, mode, average, or other calculation associated with such data.

At block 408, an inactivity timer update is provided to a communication tower(s) based on the identified idle state pattern. In this regard, the inactivity timer update might be equal to the identified idle state pattern indicating an idle state duration of four seconds or an adjustment of the identified idle state pattern to accommodate for potential deviations of the pattern (e.g., 4.2 seconds).

Returning to FIG. 2, components of network environment 200 are now referred to for describing another aspect of the present invention directed to identifying, for example, applications, devices, and/or device types, causing unnecessary transitions between idle and active states.

As described above, the management entity 206 can obtain or recognize transitions associated with the user device 202. In accordance with recognizing transitions associated with the user device 202, the management entity 206 is configured to trigger the deep packet inspector 212 to perform deep packet inspections in association with the data directed to and/or from the user device 202. In some embodiments, the management entity 206 might trigger such a deep packet inspection upon recognizing a particular frequency of transitions, frequency of transitions within a particular time period, a transition pattern, etc.

To trigger the deep packet inspection, the management entity 206 provides a deep packet inspection (DPI) indicator to the serving gateway 208, which then communicates the DPI indicator to the connectivity gateway 210. Generally, the DPI indicator provides an indication to perform a deep packet inspection for data transmissions to and/or from a particular user device. In this way, the DPI indicator can provide an indication to download packets transmitted from and/or delivered to the user device 202. As such, the DPI indicator can include a device identifier or parameter(s) such that data associated therewith can be identified. In some embodiments, the DPI indicator might be in the form of a self organizing network (SON) function.

Upon the connectivity gateway 210 receiving the DPI indicator and detecting data transmitted from or communicated to the user device 202, the connectivity gateway 210 initiates a deep packet inspection of such data by the deep packet inspector 212. In this regard, the DPI functionality performed by deep packet inspector 212 is selectively turned on or initiated for the user device 202 to identify data patterns that trigger the transitions recognized at the management entity 206. In some embodiments, the connectivity gateway 210 continues to identify data associated with the particular user device 202 and initiates a deep packet inspection each time such data is identified. In other embodiments, the connectivity gateway 210 identifies an initial item of data communicated to and/or from the user device 202. In response to the initial item of data, the connectivity gateway 210 initiates the deep packet inspector 212 to perform deep packet inspection any time traffic associated with the user device passes through. The deep packet inspector 212 can then identify and perform deep packet inspection for any associated packets.

Deep packet inspection can be performed for any amount of time. In some embodiments, deep packet inspection is performed for a predetermined amount of time. In other embodiments, deep packet inspection is performed for an amount of time determined, for example, by the management entity, the connectivity gateway 210, and/or the deep packet inspector 212. For instance, such an amount of time may be determined based on amount of traffic flow to and/or from the user device, number of transitions detected, upon a lapse of a time, such as 30 minutes, without any data flow, or the like.

As can be appreciated, rather than globally initiating deep packet inspection for all data, deep packet inspection can be performed on a device-by-device basis in accordance with such an indication, for example, generated by the management entity 206. Device-specific deep packet inspection enables collection of particular transition data when deemed of interest by the management entity 206.

In performing the deep packet inspection, the deep packet inspector 212 can collect any type of data including, but not limited to, source and/or destination IP/ports, content type, protocol, application type or name associated with the communication, domain name, number of bytes transmitted, length of data transmissions, etc. Such data can be used to generate a transitions report that includes data related to transitions, such as idle-to-active transitions and/or active-to-idle transitions.

The transitions report can be created at any number of components or devices. For example, the deep packet inspector 212 could be configured to generate the transitions report. In other cases, the deep packet inspector 212 can communicate collected data to the connectivity gateway 210 for generating a report. The connectivity gateway 210 could generate the transitions report or communicate the data or report to a report gathering entity. As can be appreciated, the report can include aggregations of data. For example, the report may be associated with a particular user device and include aggregated data associated with various deep packet inspection time periods, deep packet inspections occurring in association with various communication towers, deep packet inspections triggered by various management entities, and/or the like. As another example, the report may be associated with any number of user devices and include aggregated data associated with various time periods, various communication towers, various management entities, various types of devices, etc.

Such a transitions report can then be used to detect a pattern(s) of activity. For example, an activity pattern associated with a particular device can be detected, such as application(s) causing transitions, frequency of transitions caused by application(s), device parameters (operating system, etc.), or the like. As another example, an activity pattern associated with a set of devices can be detected, such as an application(s) that commonly causes transitions across devices, device parameters (e.g., operating system) associated with devices that frequently incurring transitions, etc. Upon discerning activity patterns, application developers, device manufacturers, or the like can be provided with suggested modifications to the application or device that will not be as impactful on the telecommunications network.

As can be appreciated, any amount or type of data to collect at the deep packet inspector 210, to include in any transitions report, and/or to determine as an activity pattern can be used. Criteria indicating specific data to capture during deep packet inspection, to include in the transitions report, and/or to attain as an activity pattern can be provided, for example, to the deep packet inspector 210. By way of example only, the management entity 206 could provide such criteria to gateways or deep packet inspector 210 when triggering the deep packet inspection for a user device.

Figure 5:
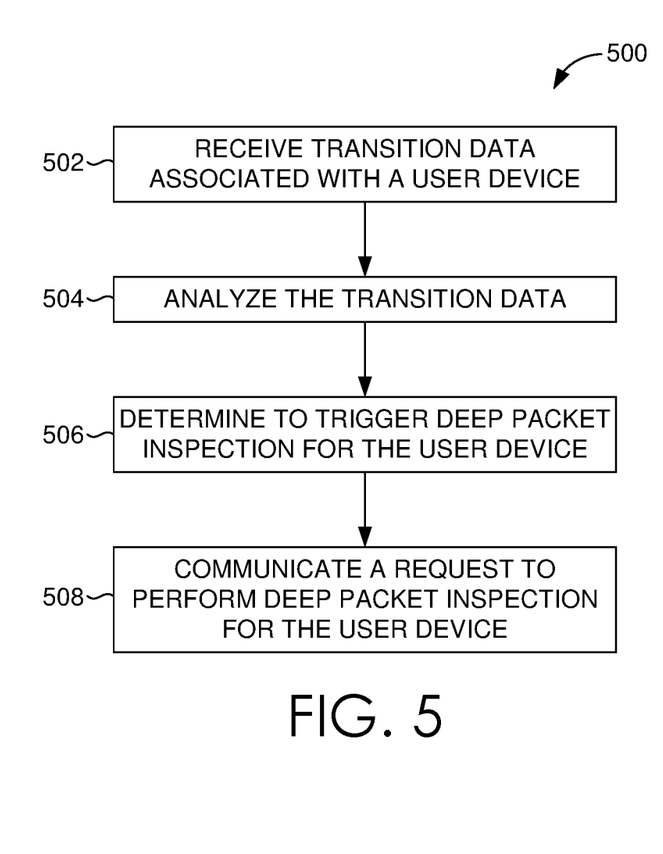
FIG. 5 provides an exemplary first method for facilitating generation of a transitions report, in accordance with embodiments of the present invention.
Figure 6:
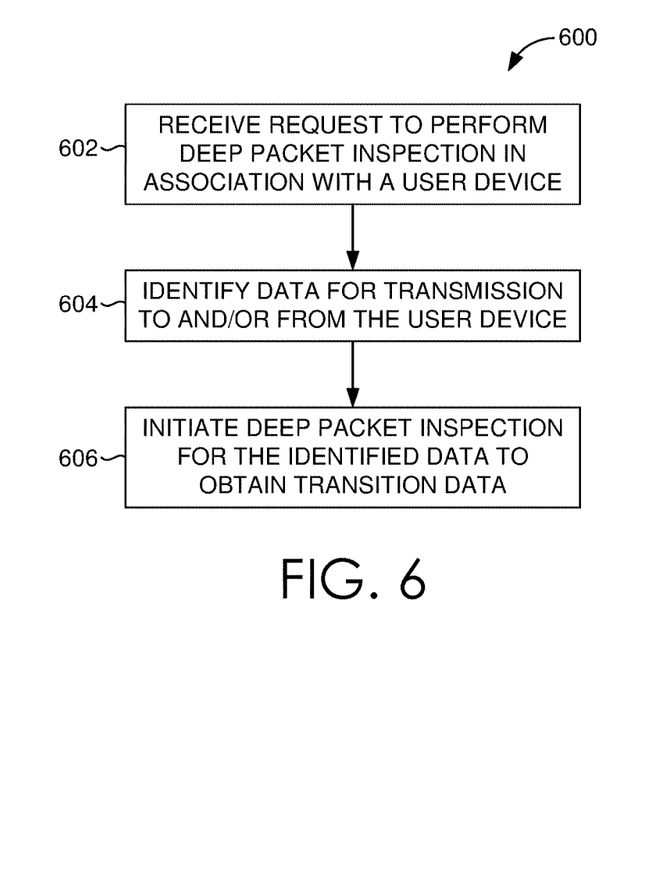
FIG. 6 provides an exemplary second method for facilitating generation of a transitions report, in accordance with embodiments of the present invention.
Figure 7:
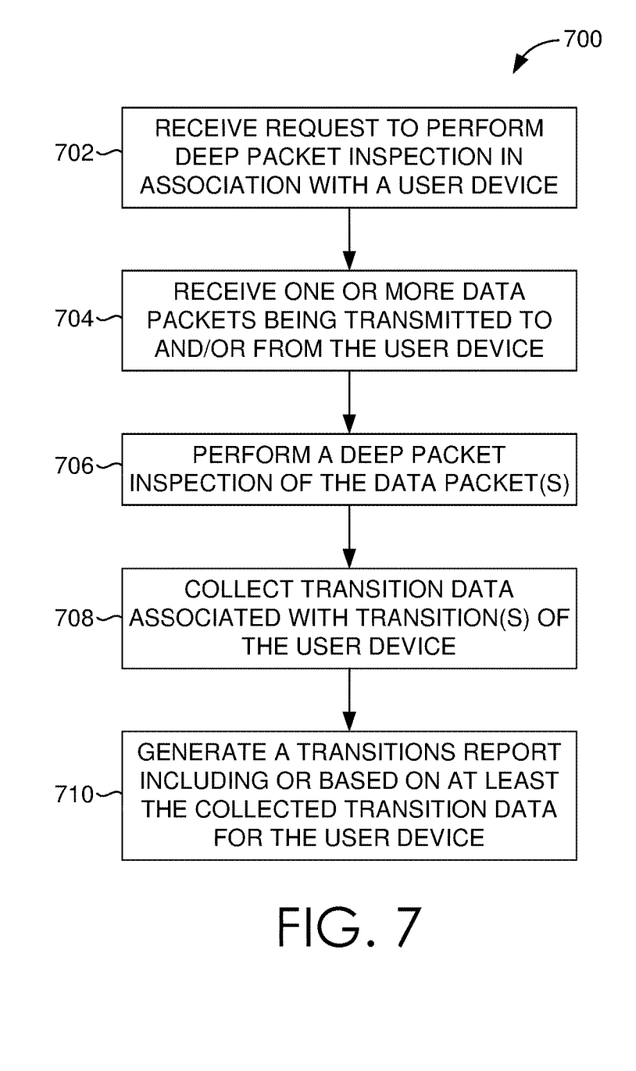
FIG. 7 provides an exemplary third method for facilitating generation of a transitions report, in accordance with embodiments of the present invention.

Turning now to FIGS. 5-7, methods for reducing transitions between idle and active states in association with a device are provided. In particular, FIGS. 5-7 show flow diagrams illustrating methods to facilitate establishing a transitions report to identify data patterns triggering transitions between idle state and active state, in accordance with embodiments of the present invention. It will be understood by those of ordinary skill in the art that the order of steps shown in the method 500 of FIG. 5, method 600 of FIG. 6, and method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention.

With initial reference to FIG. 5, in embodiments, method 500 can be performed at a communication tower, such as communication tower 204 of FIG. 2. Initially, at block 502, transition data associated with a user device is received. Such transition data can be received from a communication tower and/or user device and may include, for instance, an indication of a transition between idle and active states, an indication of a transition type, a time of transition, a time duration of a state (idle state or active state), a unique device identifier, or the like. At block 504, the transition data is analyzed. Analysis may include identifying a transition pattern(s), identifying a transition frequency, etc.

Based on the analysis, at block 506, it is determined to trigger a deep packet inspection for data communications to and/or from the user device. In some cases, a determination might also be made as to a length of time for performing deep packet inspections. In other cases, a length of time for performing deep packet inspections for the user device might be automatically implemented or dynamically determined at another device, such as connectivity gateway 210 of FIG. 2 or deep packet inspector 212 of FIG. 2. At block 508, a request to perform deep packet inspection for the user device is communicated. Such a request may be transmitted to the serving gateway 208, the connectivity gateway 210, and/or the deep packet inspector 212. Although not illustrated, the management entity may, at a later time, make a determination to terminate deep packet inspections for data transmitted to and/or from the user device and, accordingly, communicate a request to terminate deep packet inspections for the user device.

Turning now to FIG. 6, in embodiments, method 600 can be performed at a connectivity gateway, such as connectivity gateway 210 of FIG. 2. Initially, at block 602, a request to perform deep packet inspection in associated with a user device is received. At block 604, data for transmission to and/or from the user device is identified. Thereafter, deep packet inspection for the identified data is initiated to obtain or collect transition data, as indicated at block 606. Subsequent data transmitted to and/or from the user device can be communicated to or intercepted by the deep packet inspector for ongoing deep packet inspections until deep packet inspection is terminated for the user device. In some cases, termination of deep packet inspection can be initiated, for instance, based on a lapse of a predetermined time period, based on an occurrence of an event (e.g., lack of data transmissions within a time period), etc.

With reference to FIG. 7, in embodiments, method 700 can be performed at a deep packet inspector, such as deep packet inspector 212 of FIG. 2. Initially, at block 702, a request to perform deep packet inspection in association with a user device is received. At block 704, one or more data packets being transmitted to and/or from the user device is received. Subsequently, at block 706, a deep packet inspection is performed for each of the data packets. During the deep packet inspection, specific attributes pertaining to transitions of the user device are obtained, collected, or captured, as indicated at block 708. For example, any type of data can be collected including, but not limited to, source and/or destination IP/ports, content type, protocol, application type or name associated with the communication, domain name, number of bytes transmitted, length of data transmissions, etc. At block 710, a transitions report is generated using at least the data captured from the deep packet inspect for the user device. The transitions report includes data related to transitions such as idle-to-active transitions and active-to-idle transitions. The transitions report might include the collected data for the user device, an aggregation of collected data (e.g., associated with multiple user devices, associated with multiple communication towers, etc.), or the like. As can be appreciated, another component can generate the transitions report from the collected data.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method, the method comprising:
   when a communication tower receives data from a user device, starting a timer having a defined time duration;
   building a path for the user device based on receiving the data from the user device;
   when the defined time duration of the timer expires without the communication tower subsequently receiving additional data from the user device, determining that the user device is transitioning from active to idle;
   tearing down the path based on determining that the user device is transitioning to from active to idle;
   communicating a transition indicator to a control node to indicate that the user device is transitioning from active to idle;
   identifying, at the control node, a new time duration based on the transition indicator, wherein the new time duration is not the same as the defined time duration of the timer;
   updating the timer subsequent to tearing down the path, wherein updating comprises changing the timer from the defined time duration to the new time duration.

2. The media of claim 1, further comprising analyzing the transition indicators to identify the new time duration when a frequency of transition indicators communicated to the control node meets a defined frequency.

3. The media of claim 2, further comprising:
   based on analyzing the transition indicators, identifying the transition pattern of the user device transitioning between idle and active; and
   identifying at least one of a device type or a device parameter of the user device that is associated with the transition pattern of the user device.

4. The media of claim 3, wherein identifying the transition pattern of the user device comprises identifying an idle pattern, wherein the idle pattern indicates the user device exhibits a pattern of being idle for n second(s) before transitioning to active.

5. The media of claim 4, wherein updating the timer comprises changing the timer from the defined time duration to the new time duration based on the idle pattern.

6. The media of claim 3, wherein identifying the transition pattern of the user device comprises identifying an active pattern, wherein the active pattern indicates the user device exhibits a pattern of being active for n second(s) before transitioning to idle.

7. The media of claim 6, wherein updating the timer comprises changing the timer from the defined time duration to the new time duration based on the active pattern.

8. The media of claim 6, wherein the timer is updated only when the control node recognizes a transition pattern from a plurality of transition indicators.

9. A method comprising:
   obtaining a plurality of transition indicators for a user device, each of the plurality of transition indicators corresponding to a transition of the a user device between idle and active;
   based on the plurality of transition indicators, identifying a transition pattern of the user device transitioning between idle and active, wherein the transition pattern specifies a reoccurring time duration during which the user device is idle;
   identifying at least one of a device type or a device parameter of the user device that is causing the transition pattern of the user device; and
   setting a timer based on the reoccurring time duration of the transition pattern of the user device, wherein a communication tower uses the timer to determine when to tear down paths to the user device.

10. The method of claim 9, further comprising:
    when additional transition indicators are obtained for the user device, determining that the additional transition indicators do not align with the transition pattern;
    identifying a new time duration based on the additional transition indicators obtained for the user device;
    updating the timer based on the new time duration for the user device, wherein the communication tower uses the updated timer to determine when to tear down paths to the user device; and
    preventing tear down of a path between the communication tower and the user device, based on the updated timer.

11. The method of claim 10, wherein preventing tear down of the path between the communication tower and the user device based on the updated timer further comprises:
    recognizing data sent from the user device;
    starting the updated timer based on recognizing data sent from the user device;
    building a path between the communication tower and the user device;
    when additional data is subsequently sent from the user device before the updated timer expires, restart the timer; and
    when the updated timer expires without additional data being subsequently sent from the user device:
    recognizing that the user device is transitioning from active to idle; and
    based on recognizing the user device is transitioning from active to idle, tearing down the path between the communication tower and the user device.

12. The method of claim 9, further comprising communicating, to the user device, a request that the user device avoid transitioning to idle based on the transition pattern.

13. The method of claim 9, wherein setting the timer based on the reoccurring time duration of the transition pattern of the user device comprises changing the timer from a default time duration to the reoccurring time duration of the transition pattern.

14. The method of claim 9, wherein setting the timer based on the reoccurring time duration of the transition pattern of the user device comprises setting the timer to exceed the reoccurring time duration.

15. The method of claim 9, further comprising aggregating the plurality of transition indicators and determining an average length of time the user device remains idle between transitions.

16. A system comprising:
a control node configured to request a deep packet inspection for data packets communicated between a communication tower and a user device, to identify a transition pattern of the user device that is a reoccurring time duration during which the user device is idle between transitions, to set a timer for a communication tower to tear down paths to the user device based on the transition pattern, and to update the timer subsequent to tearing down the paths to the user device, wherein updating includes changing the timer from to a new time duration;
a connectivity gateway configured to receive the deep packet inspection request and provide the data packets having been communicated between the communication tower and the user device to a deep packet inspector; and
a deep packet inspector configured to:
perform a deep packet inspection of the data packets having been communicated between the communication tower;
obtain information regarding transitions of the user device between active and idle from the deep packet inspection; and
communicate the information regarding the transitions of the user device to the control node.

17. The system of claim 16, wherein the control node is configured to:
identify at least one of a device type or a device parameter of the user device that is causing the transition pattern of the user device.

18. The system of claim 17, wherein a communication tower uses the timer to determine when to tear down paths to the user device.

19. The system of claim 16, wherein the deep packet inspector is configured to generate a report that includes information specifying at least one of a frequency of idle-to-active transitions or a frequency of active-to-idle transitions and communicate the report to the control node.

20. The system of claim 19, wherein the control node is configured to identify, using the information specifying at least one of a frequency of idle-to-active transitions or a frequency of active-to-idle transitions in the report, an active pattern and an idle pattern of the user device.

\* \* \* \* \*